Patented Sept. 3, 1940

2,213,267

UNITED STATES PATENT OFFICE 2,213,267

RECOVERY OF ACETYLENE-CONTAINING GASES FREE FROM CARBON BLACK AND HYDROCYANIC ACID

Paul Baumann, Leuna, and Heinrich Schilling, Ludwigshafen-on-the-Rhine, Germany, assignors, by mesne assignments, to Jasco, Incorporated, a corporation of Louisiana No Drawing. Application January 11, 1939, Serial No. 250,364. In Germany January 15, 1938

3 Claims. (Cl. 260—679)

The present invention relates to improvements in the production of acetylene-containing gases which are free from carbon black and hydrocyanic acid.

In the preparation of acetylene by the thermal splitting of hydrocarbons, in particular in the electric arc, carbon is obtained as a by-product in the form of carbon black. The working up of the reaction gases containing carbon black may be carried out by quenching the hot gases by spraying in water and then washing them with water for the purpose of separating the carbon black. In this manner it is possible, however, to separate only a part of the carbon black. For the removal of the remainder of the carbon black, the water may be atomised (formed into a mist) in the gas in the finest form, for example with a fine nozzle or with the aid of a gaseous carrier. By repeating such an atomisation several times, the carbon black content of the gas may be reduced to from 50 to 100 milligrams per cubic metre. The fact that the process requires a voluminous apparatus and considerable amounts of energy is a drawback. Furthermore the use of the said comparatively large amounts of water results in appreciable waste of acetylene.

We have now found that carbon black can be separated from the reaction gases obtained in the thermal splitting of hydrocarbons for the purpose of obtaining acetylene, by quenching the gases with water and then washing the moist gases with water at an elevated temperature. It is advantageous to carry out the washing at above 50°, preferably at 80° centigrade. Contrary to expectation, it has been found that in this manner the carbon black can be washed out from the gas substantially or practically completely in one working operation. The water containing carbon black flowing away from the washer readily deposits the carbon black in a settling vessel and the washing water freed from carbon black may be used again for the washing. The separation of carbon black and water in the settling vessel takes place considerably more rapidly than in cases when the washing of the gas containing carbon black is carried out with cold water. In the latter case, settling vessels more than twice as large as in the present case are required. A further advantage of the process according to this invention consists in the fact that the carbon black obtained has better properties than that obtained by washing with cold water.

The amount of water sprayed in for the quenching of the hot reaction gases is preferably regulated so that a mixture of gas and water vapour at a temperature of at least 50° centigrade is directly formed, the said mixture then being washed in the abovementioned manner with warm water.

We have further found that the said method of working is also capable of removing hydrocyanic acid which is usually present in the beforementioned reaction gases. The hydrocyanic acid is substantially or even practically completely removed from the said reaction gases, although the operation is carried out while hot. The possibility of directly washing out the hydrocyanic acid from the reaction gases in the said manner constitutes a considerable advantage because it is unnecessary to use special chemicals such as have hitherto been necessary for binding the hydrocyanic acid from such gases. The hydrocyanic acid may be recovered from gases according to this invention even in cases when the thermal splitting of the hydrocarbons has been carried out in such manner that only a small amount of carbon black is formed.

The washing is advantageously carried out at such a temperature that, apart from hydrocyanic acid, as little as possible of other gas constituents, in particular acetylene, are dissolved. While for a complete separation of carbon black a working temperature of about 80° C. is most favorable, it is recommended that a temperature of about 50° C. should generally speaking be maintained for the most complete separation possible of hydrocyanic acid.

The following examples will further illustrate how this invention may be carried out in practice but the invention is not restricted to these examples.

Example 1

1800 cubic metres of a gas (obtained by treatment of waste gases from pressure hydrogenation in the electric arc for the purpose of producing acetylene and containing about 24 grams of carbon black per cubic metre) are quenched by spraying in water so that the gas has a temperature of 80° centigrade and is saturated with water vapor; the gas is then treated under an over-pressure of 50 millimetres (mercury gauge) in a washing tower with 30 cubic metres per hour of water heated to 80° centigrade. The warm water leaves the tower at the bottom with more than 97 per cent of the carbon black contained in the gas. The water is then led through an elongated settling vessel. The time during which the water remains in the settling vessel amounts to about 5 minutes. In this time the carbon black has collected on the surface of the water. The clear water free from carbon black is withdrawn from the bottom of the settling vessel and again supplied to the washing tower. The separated carbon black is skimmed off the surface of the water with a scoop device which moves in a direction opposite to that in which the water flows, and worked up into dry material in the usual way.

The gas at a temperature of about 80° centigrade leaving the washing tower is treated in counter-current in a second washing tower with 15 cubic metres per hour of cold water. In this way the gas is cooled to room temperature. The water leaving the bottom of the tower which has become warm is also led through a settling vessel and reurned to the washing tower after cooling to room temperature. The settling vessel in the cycle of the second washer serves as a safety measure in case the removal of carbon black in the first washer temporarily fails. The washing water from the first and second washers may also be led simultaneously into a common settling vessel.

Example 2

1000 cubic metres of a gas containing besides small amounts of carbon black 3 grams of hydrocyanic acid per cubic metre in addition to 18 per cent of acetylene and 0.5 per cent of higher acetylene hydrocarbons (obtained by the treatment of waste gases from pressure hydrogenation in the electric arc for the purpose of producing acetylene) are cooled to 55° centigrade by spraying in water and then treated in a washing tower with 25 cubic metres per hour of water in counter-current. The temperature of the water leaving the washing tower is 50° centigrade. The gas leaving the washing tower at the top is free from hydrocyanic acid and practically free from carbon black.

The water leaving the washing tower is led into a column under a pressure of 0.12 atmosphere. The dissolved hydrocyanic acid is expelled therein by blowing in steam and sucked away at the top of the column. The water sprayed in for the cooling of the hot gases to 55° centigrade is also treated in the same way so that practically the whole of the hydrocyanic acid contained in the reaction gas is recovered. After or preferably before the removal of the hydrocyanic acid from the water in the said column, the water is passed through a settling vessel as described in Example 1, in order to separate the carbon black taken up from the initial gas.

What we claim is:

1. A process for purifying acetylene-containing gases obtained by the thermal splitting of hydrocarbons from carbon black and hydrocyanic acid which comprises quenching the hot reaction gases of the thermal splitting treatment with water, and washing the moist gases with water at a temperature of from about 50 to about 80° C.

2. A process for purifying acetylene-containing gases obtained by the thermal splitting of hydrocarbons from carbon black and hydrocyanic acid which comprises quenching the hot reaction gases of the thermal splitting treatment by spraying water into them, and washing the moist gases with water at a temperature of from about 50 to about 80° C.

3. In the process as claimed in claim 2 the step of regulating the amount of water to be sprayed into the gases so that the temperature of the quenched gas-vapor mixture amounts to about from 50 to 80° centigrade, and then washing the mixture with water at the said temperature.

PAUL BAUMANN.
HEINRICH SCHILLING.

CERTIFICATE OF CORRECTION.

Patent No. 2,213,267. September 3, 1940.

PAUL BAUMANN, ET AL.

It is hereby certified that error appears in the above numbered patent requiring correction as follows: In the grant, line 14, strike out "Paul Baumann and Heinrich Schilling, their heirs or assigns" and insert instead --Jasco, Incorporated, its successors or assigns--; and that the said Letters Patent should be read with this correction therein that the same may conform to the record of the case in the Patent Office.

Signed and sealed this 23rd day of September, A. D. 1941.

(Seal)

Henry Van Arsdale,
Acting Commissioner of Patents.